United States Patent [19]

Ota et al.

[11] Patent Number: 4,847,591

[45] Date of Patent: Jul. 11, 1989

[54] VEHICLE HEIGHT DETECTING SYSTEM

[75] Inventors: Kazuomi Ota, Anjo; Hiroaki Nishimura, Okazaki; Hirofumi Mokuya, Oobu; Kohji Kamiya, Chita; Yoshinori Ishiguro, Chiryu; Kiyoshi Miyake, Kariya; Hiroshi Sakurai, Nagoya; Yuuji Katsuna, Hekinan; Joji Yamaguchi, Toyota, all of Japan

[73] Assignees: Nippondenso Co., Ltd., Kariya; Toyota Jidosha & Kabushiki Kaisha, Toyota, both of Japan

[21] Appl. No.: 139,851

[22] Filed: Dec. 30, 1987

[30] Foreign Application Priority Data

Jan. 8, 1987 [JP] Japan .................................. 62-2449

[51] Int. Cl.$^4$ ............................................. B60Q 1/00
[52] U.S. Cl. .................................... 340/440; 340/438; 340/666; 280/DIG. 1; 364/424.01; 364/424.05
[58] Field of Search ...................... 340/52 R, 665, 666, 340/686; 280/707, 711, 689, 6 R, 6 H, DIG. 1; 364/424; 307/10 R; 73/118.1

[56] References Cited

U.S. PATENT DOCUMENTS 4,741,206 5/1988 Ishiguro et al. ...................... 340/686

FOREIGN PATENT DOCUMENTS 60-34911 3/1985 Japan .

Primary Examiner—Donnie L. Crosland
Attorney, Agent, or Firm—Cushman, Darby & Cushman

[57] ABSTRACT

A vehicle height sensor includes a switching circuit which is turned on and off in accordance with a vehicle height. When a drive signal is outputted to the vehicle height sensor, the vehicle height sensor is activated. A connector is connected to an output side of the switching circuit. A digital vehicle height data signal is transmitted from the switching circuit via the connector. A preset signal is outputted from the vehicle height sensor to the connector when a check signal is generated. The preset signal represents preset check data. A data receives the preset signal via the connector and reads the check data from the preset signal. The read check data is compared with a predetermined reference data. The connector is judged to be wrong when the read check data differs from the reference data.

14 Claims, 9 Drawing Sheets

VEHICLE HEIGHT DETECTING SYSTEM

BACKGROUND OF THE INVENTION

1. Field of the Invention

This invention relates to a system for detecting the height of a vehicle, such as an automotive vehicle. This invention also relates to a system including a sensor and a connection to the sensor.

2. Description of the Prior Art

Some automotive vehicle height control systems or levelling systems have a sensor generating a signal representative of the vehicle height. The vehicle height signal is transmitted from the sensor to an electronic controller via an electrical connection between the sensor and the controller. Vehicle height varying actuators are adjusted via the electronic controller in accordance with the vehicle height signal so that the vehicle height can be maintained within a desired range. A break of the electrical connection between the vehicle height sensor and the electronic controller causes unreliable vehicle height control.

Japanese published unexamined utility model application 60-34911 discloses a system for detecting a malfunction of a vehicle height sensor of the digital output type. A preset state or states of the digital vehicle height signal are allotted for indications of a malfunction of the vehicle height sensor. The other or remaining states of the digital signal are used to indicate the vehicle height.

SUMMARY OF THE INVENTION

It is an object of this invention to provide a vehicle height detecting system which can check an electrical connection to a vehicle height sensor.

In accordance with a first aspect of this invention, a vehicle height detecting system includes a vehicle height sensor having a switching circuit which is turned on and off in accordance with a vehicle height. When a drive signal is outputted to the vehicle height sensor, the vehicle height sensor is activated. A connection means is connected to an output side of the switching circuit. A digital vehicle height data signal is transmitted from the switching circuit via the connection means. A preset signal is outputted from the vehicle height sensor to the connection means when a check signal is generated. The preset signal represents preset check data. A device receives the preset signal via the connection means and reads the check data from the preset signal. The read check data is compared with a predetermined reference data. The connection means is judged to be wrong when the read check data differs from the reference data.

In a system according to a second aspect of this invention, a sensor generates a signal representative of sensed information, and there is a connection to the sensor. A reference signal is generated. Either of the information signal and the reference signal is selectively transmitted via the connection. A determination is made as to whether or not transmission of the reference signal via the connection is successful.

DESCRIPTION OF THE FIRST PREFERRED EMBODIMENT

Figure 1:
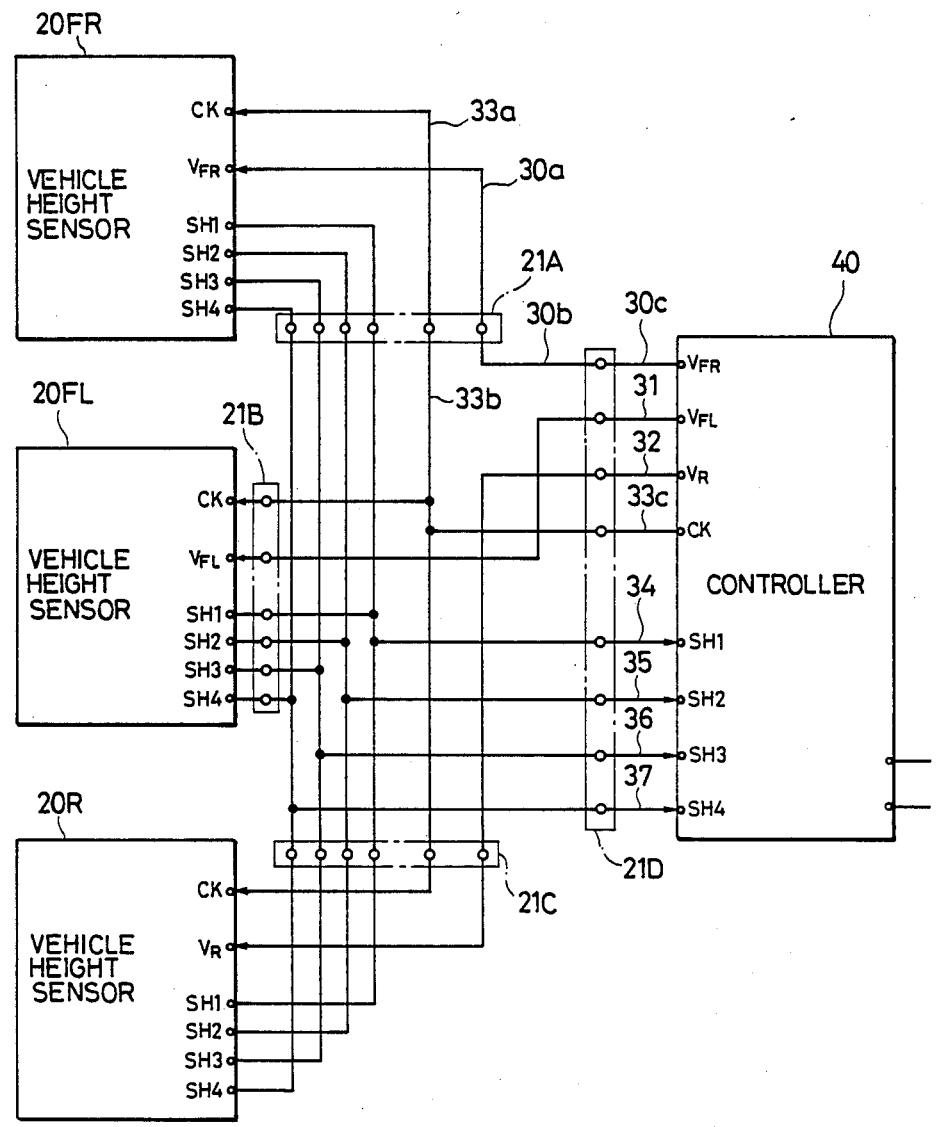
FIG. 1 is a diagram of electrical connections among vehicle height sensors and an electronic controller in a vehicle height detecting system according to a first embodiment of this invention.

With reference to FIG. 1, vehicle height sensors 20FR, 20FL, and 20R are associated with front-right vehicle wheel, front-left vehicle wheel, and a rear vehicle wheel respectively. Each of the vehicle height sensors 20FR, 20FL, and 20R detects a vertical distance between a spring upper member and a spring lower member, that is, a vertical distance between a sprung portion and an unsprung portion of a vehicle body, as an indication of a vehicle height in respect of the associated vehicle wheel.

Each of the vehicle height sensors 20FR, 20FL, and 20R has output terminals SH1, SH2, SH3, and SH4 via which a four-bit digital signal representative of a sensed vehicle height is outputted. In addition, each of the vehicle height sensors 20FR, 20FL, and 20R has a terminal CK receiving a check enabling signal. Furthermore, the vehicle height sensors 20FR, 20FL, and 20R have terminals VFR, VFL, and VR receiving drive signals respectively.

The check terminal CK of the vehicle height sensor 20FR is connected to a corresponding terminal CK of an electronic controller 40 via a check signal line 33a, a connector 21A, a check signal line 33b, a connector 21D, and a check signal line 33c. The drive terminal VFR of the vehicle height sensor 20FR is connected to a corresponding drive terminal VFR of the controller 40 via a drive signal line 30a, the connector 21A, a drive signal line 30b, the connector 21D, and a drive signal line 30c. The output terminals SH1, SH2, SH3, and SH4 of the vehicle height sensor 20FR are connected respectively to corresponding input terminals SH1, SH2, SH3, and SH4 of the controller 40 via data signal lines and the connectors 21A and 21D.

The check terminal CK of the vehicle height sensor 20FL is connected to the check terminal CK of the controller 40 via check signal lines, a connector 21B, and the connector 21D. The drive terminal VFL of the vehicle height sensor 20FL is connected to a corresponding drive terminal VFL of the controller 40 via drive signal lines 31 and the connectors 21B and 21D. The output terminals SH1-SH4 of the vehicle height sensor 20FL are connected respectively to the corresponding input terminals SH1-SH4 of the controller 40 via data signal lines and the connectors 21B and 21D.

The check terminal CK of the vehicle height sensor 20R is connected to the check terminal CK of the controller 40 via check signal lines, a connector 21C, and the connector 21D. The drive terminal VR of the vehicle height sensor 20R is connected to a corresponding drive terminal VR of the controller 40 via drive signal lines 32 and the connectors 21C and 21D. The output terminals SH1–SH4 of the vehicle height sensor 20R are connected respectively to the corresponding input terminals SH1–SH4 of the controller 40 via data signal lines and the connectors 21C and 21D.

As understood from the previous description, the check terminals CK of the vehicle height sensors 20FR, 20FL, and 20R are connected in common to the check terminal CK of the controller 40. The check signal lines connecting the sensor check terminals and the controller check terminal have a common portion 33c. The output terminals SH1–SH4 of the vehicle height sensor 20FR, the output terminals SH1–SH4 of the vehicle height sensor 20FL, and the output terminals SH1–SH4 of the vehicle height sensor 20R are connected in common to the input terminals SH1–SH4 of the controller 40 respectively. The data signal lines connecting the sensor output terminals SH1 and the controller input terminal SH1 have a common portion 34. The data signal lines connecting the sensor output terminals SH2 and the controller input terminal SH2 have a common portion 35. The data signal lines connecting the sensor output terminals SH3 and the controller input terminal SH3 have a common portion 36. The data signal lines connecting the sensor output terminals SH4 and the controller input terminal SH4 have a common portion 37.

In this way, the vehicle height sensors 20FR, 20FL, and 20R, and the controller 40 are connected via wire harnesses including the signal lines and the connectors.

Figure 2:
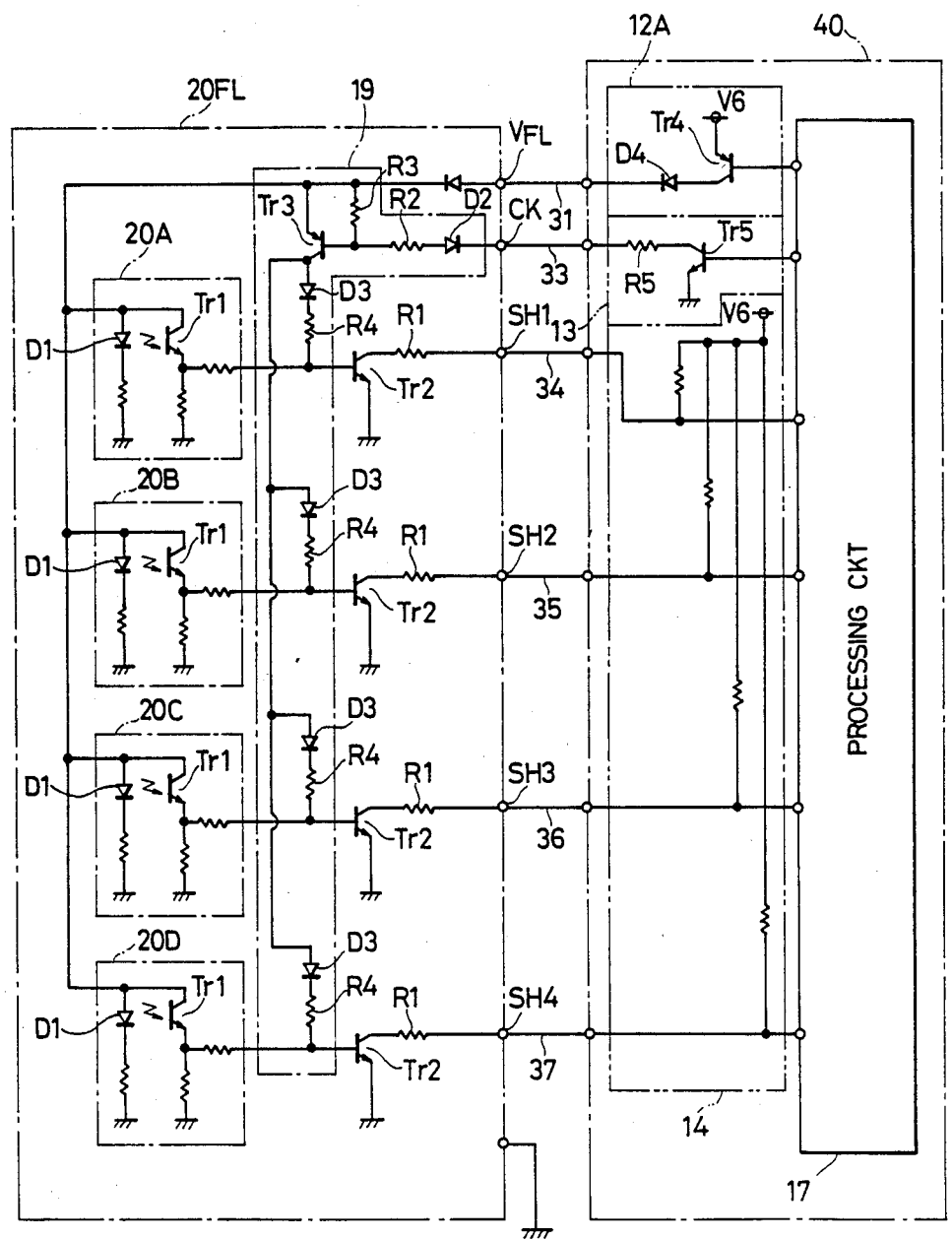
FIG. 2 is a diagram of the controller and one of the vehicle height sensors of FIG. 1.

As shown in FIG. 2, the vehicle height sensor 20FL includes photo-interrupters 20A, 20B, 20C, and 20D. The photo-interrupters 20A–20D change between ON states and OFF states as the related vehicle height varies. Each of the photo-interrupters 20A, 20B, 20C, and 20D includes a pair of a light-emitting diode D1 and a phototransistor Tr1 optically connected via a light path which is selectively blocked and unblocked in accordance with an angular position of a disc (not shown) having slits. The angular position of the disc depends on the vehicle height. Drive signal input terminals of the photo-interrupters 20A–20D are connected in common to the sensor drive terminal VFL. Data output terminals of the photo-interrupters 20A–20D are connected respectively to the sensor output terminals SH1–SH4 via transistors Tr2 and resistors R1. When the photo-interrupter 20A changes between the ON state and the OFF state, the photo-interrupter 20A applies a high potential and a low potential to the base of the associated transistor Tr2 so that the transistor Tr2 is made conductive and nonconductive respectively. When the transistor Tr2 is conductive and nonconductive, the potential of the output terminal SH1 is low and high respectively. In this way, the potential of the output terminal SH1 reflects the state of the associated photo-interrupter 20A. Similarly, the potentials of the output terminals SH2–SH4 reflect the states of the associated photo-interrupters 20C–20D respectively.

Mechanical and optical portions of the vehicle height sensor 20FL are shown, for example, in U.S. Pat. App. Ser. No. 942,082, by Ishiguro et al, filed on December 15, 1986, the disclosure of which is hereby incorporated by reference.

The vehicle height sensor 20FL includes a reference signal circuit 19 connected to the check terminal CK and also connected to the output terminals SH1–SH4 via the transistors Tr2 and the resistors R1. The reference signal circuit 19 includes a transistor Tr3 whose emitter is connected to the drive terminal VFL via a diode (no reference character). The base of the transistor Tr3 is connected to the check terminal CK via a resistor R2 and a diode D2. The base of the transistor Tr3 is also connected to the drive terminal VFL via a resistor R3. The reference signal circuit 19 includes four sets of a series combination of a diode D3 and a resistor R4. One end of the first set is connected to the junction between the photo-interrupter 20A and the associated transistor Tr2. The other end of the first set is connected to the collector of the transistor Tr3. One end of the second set is connected to the junction between the photo-interrupter 20B and the associated transistor Tr2. The other end of the second set is connected to the collector of the transistor Tr3. One end of the third set is connected to the junction between the photo-interrupter 20C and the associated transistor Tr2. The other end of the third set is connected to the collector of the transistor Tr3. One end of the fourth set is connected to the junction between the photo-interrupter 20D and the associated transistor Tr2. The other end of the fourth set is connected to the collector of the transistor Tr3.

A drive circuit 12A within the controller 40 includes a transistor Tr4 and a diode D4. The emitter of the transistor Tr4 is connected to an electric power source V6. The collector of the transistor Tr4 is connected to the drive terminal VFL of the vehicle height sensor 20FL via the diode D4 and the drive signal line 31. The base of the transistor Tr4 is connected to a processing circuit 17 within the controller 40. The transistor Tr4 is made conductive and nonconductive by a control signal fed from the processing circuit 17, allowing and inhibiting supplies of drive currents from the power source V6 to the photo-interrupters 20A–20D in the form of high-level drive signals.

A check enabling circuit 13 within the controller 40 includes a transistor Tr5 and a resistor R5. The base of the transistor Tr5 is connected to the processing circuit 17. The emitter of the transistor Tr5 is grounded. The collector of the transistor Tr5 is connected to the check terminal CK of the vehicle height sensor 20FL via the resistor R5 and the check signal line 33. The transistor Tr5 is made conductive and nonconductive by a control signal fed from the processing circuit 17, allowing and inhibiting supply of a low-level check enabling signal to the check terminal of the vehicle height sensor 20FL.

The output terminals SH1–SH4 of the vehicle height sensor 20FL are connected to the processing circuit 17 via the data signal lines 34–37 and a vehicle height data input circuit 14 within the controller 40. The output terminals SH1–SH4 of the vehicle height sensor 20FL are also connected to the power source V6 via the data signal lines 34–37 and resistors (no reference character) within the vehicle height data input circuit 14.

When the drive circuit 12A supplies a high-level drive signal to the vehicle height sensor 20FL, the sensor 20FL is activated so that the photo-interrupters 20A–20D assume states depending on the vehicle height. Accordingly, the vehicle height sensor 20FL generates a four-bit signal representative of the vehicle height which appears at the output terminals SH1–SH4.

The vehicle height signal is transmitted from the vehicle height sensor 20FL to the processing circuit 17 within the controller 40 via the data signal lines 34–37 and the vehicle height data input circuit 14. The state "0000" of the four-bit signal is allotted for a check on the data signal lines 34–37. Most of the other states of the vehicle height signal are generally used to indicate the vehicle height. The vehicle height sensor 20FL is designed so as to assume the state "1111" when the vehicle height sensor 20FL is deactivated.

When the vehicle height sensor 20FL is activated and the check circuit 13 supplies a low-level check enabling signal to the sensor 20FL, the transistor Tr3 within the reference signal circuit 19 is made conductive and thus currents flow through the base-emitter paths of the transistors Tr2 so that all the transistors Tr2 are conductive independent of the states of the photo-interrupters 20A–20D. Accordingly, the four-bit signal appearing at the output terminals SH1–SH4 is forced to assume the state "0000". In this way, when a drive signal and a check enabling signal are supplied to the vehicle height sensor 20FL, a reference signal "0000" different from the normal sensor output signal is generated and is transmitted from the vehicle height sensor 20FL to the controller 40 via the data signal lines 34–37. In cases where all the data signal lines 34–37 are normal, the "0000" signal is transmitted to the processing circuit 17. In cases where at least one of the data signal lines 34–37 is defective or abnormal, the four-bit signal received by the processing circuit 17 assumes a state different from the state "0000".

In addition, when the drive signal line 31 breaks or short-circuits, theffour-bit signal received by the processing circuit 17 remains in the state "1111" independent of the states of the photo-interrupters 20A–20D.

Figure 3:
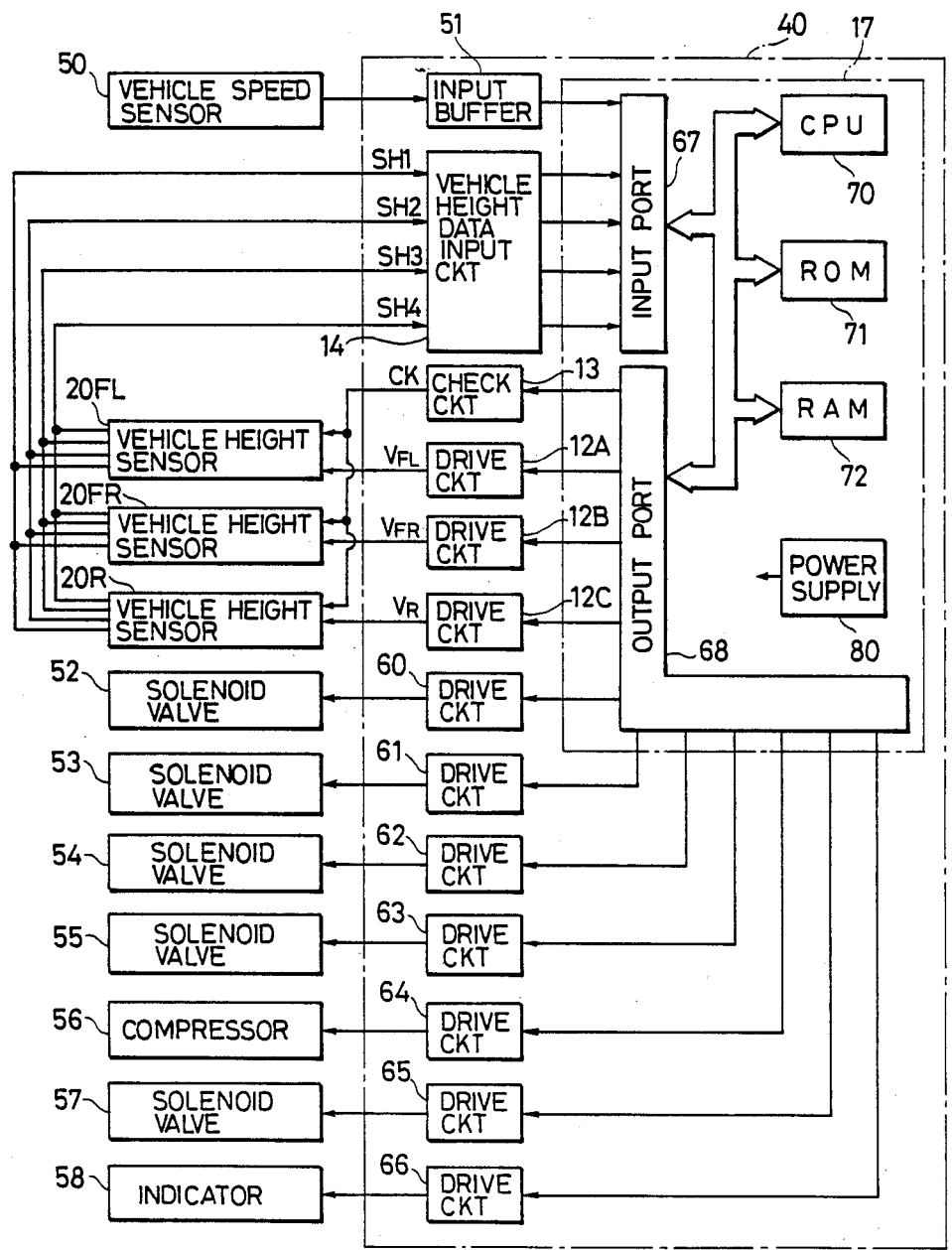
FIG. 3 is a block diagram of a vehicle height control system including the vehicle height detecting system of FIG. 1.

As shown in FIG. 3, the controller 40 includes drive circuits 12A, 12B, and 12C which supply drive signals to the vehicle height sensors 20FL, 20FR, and 20R in accordance with control signals from an output port 68 of the processing circuit 17. The designs of the vehicle height sensors 20FR and 20R are similar to the design of the vehicle height sensor 20FL of FIG. 2. The designs of the drive circuits 12B and 12C are similar to the design of the drive circuit 12A of FIG. 2. The check circuit 13 supplies a common check enabling signal to the vehicle height sensors 20FL, 20FR, and 20R in accordance with a control signal from the output port 68 of the processing circuit 17. The vehicle height data input circuit 14 receives the four-bit vehicle height signals from the vehicle height sensors 20FL, 20FR, and 20R. The vehicle height data are transferred from the input circuit 14 to an input port 67 of the processing circuit 17.

An input buffer 51 within the controller 40 receives a signal representative of a vehicle speed which is outputted by a vehicle speed sensor 50. The vehicle speed data is transferred from the input buffer 51 to the input port 67 of the processing circuit 17.

A vehicle height adjustment mechanism includes solenoid valves 52, 53, 54, and 55 controlling air suspensions of the front-left vehicle wheel, the front-right vehicle wheel, the rear-left vehicle wheel, and the rear-right vehicle wheel respectively. The vehicle height adjustment mechanism also includes an air compressor 56 and an air relief solenoid valve 57. The devices 52, 53, 54, 55, 56, and 57 are connected to the output port 68 via drive circuits 60, 61, 62, 63, 64, and 65 within the controller 40 respectively. An indicator 58 is connected to the output port 68 via a drive circuit 66 within the controller 40. The devices 52–58 are controlled by the processing circuit 17 on the basis of the vehicle height data and the vehicle speed data.

The processing circuit 17 includes a combination of the input port 67, the output port 68, a central processing unit (CPU) 70, a read-only memory (ROM) 71, and a random-access memory (RAM) 72. The processing circuit 17 also includes a power supply circuit 80. When an ignition key switch (not shown) is in an accessory position or an ON position, the power supply circuit 80 feeds drive currents and voltages to the devices and circuits within the controller 40.

The controller 40 controls the solenoid valves 52–55, and 57, and the compressor 56 and thus adjusts quantities of air within the air suspensions in accordance with the vehicle height data and the vehicle speed data so that the vehicle height can be maintained within a desired range dependent on the vehicle speed data. In addition, the controller 40 checks the connections among the controller 40 and the vehicle height sensors 20FR, 20FL, and 20R. When the controller 40 detects a malfunction of the connections, the controller 40 activates the indicator 58 to inform of the malfunction.

Figure 4:
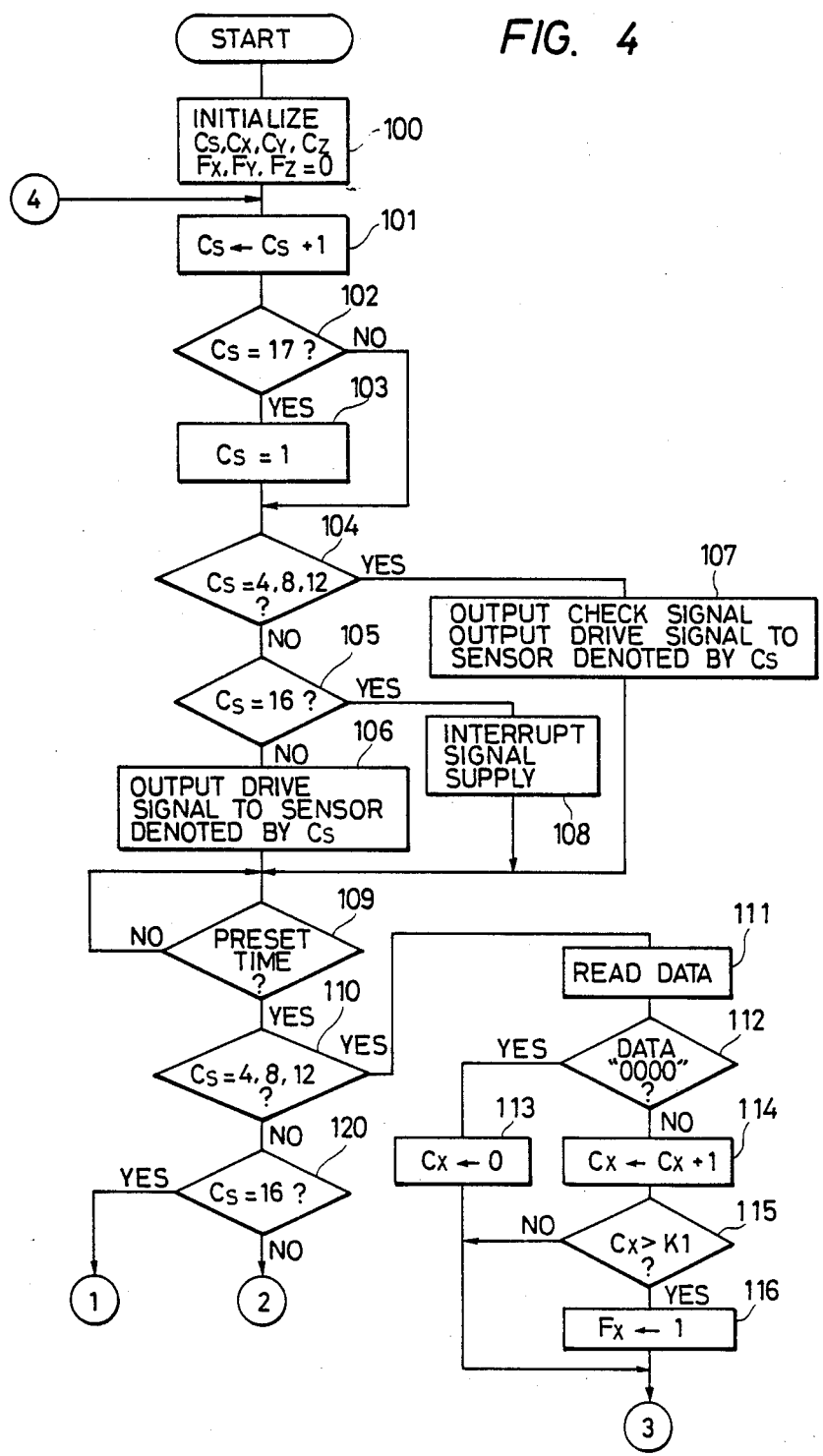
FIGS. 4 and 5 are a flowchart of a program operating the controller of FIGS. 1-3.
Figure 5:
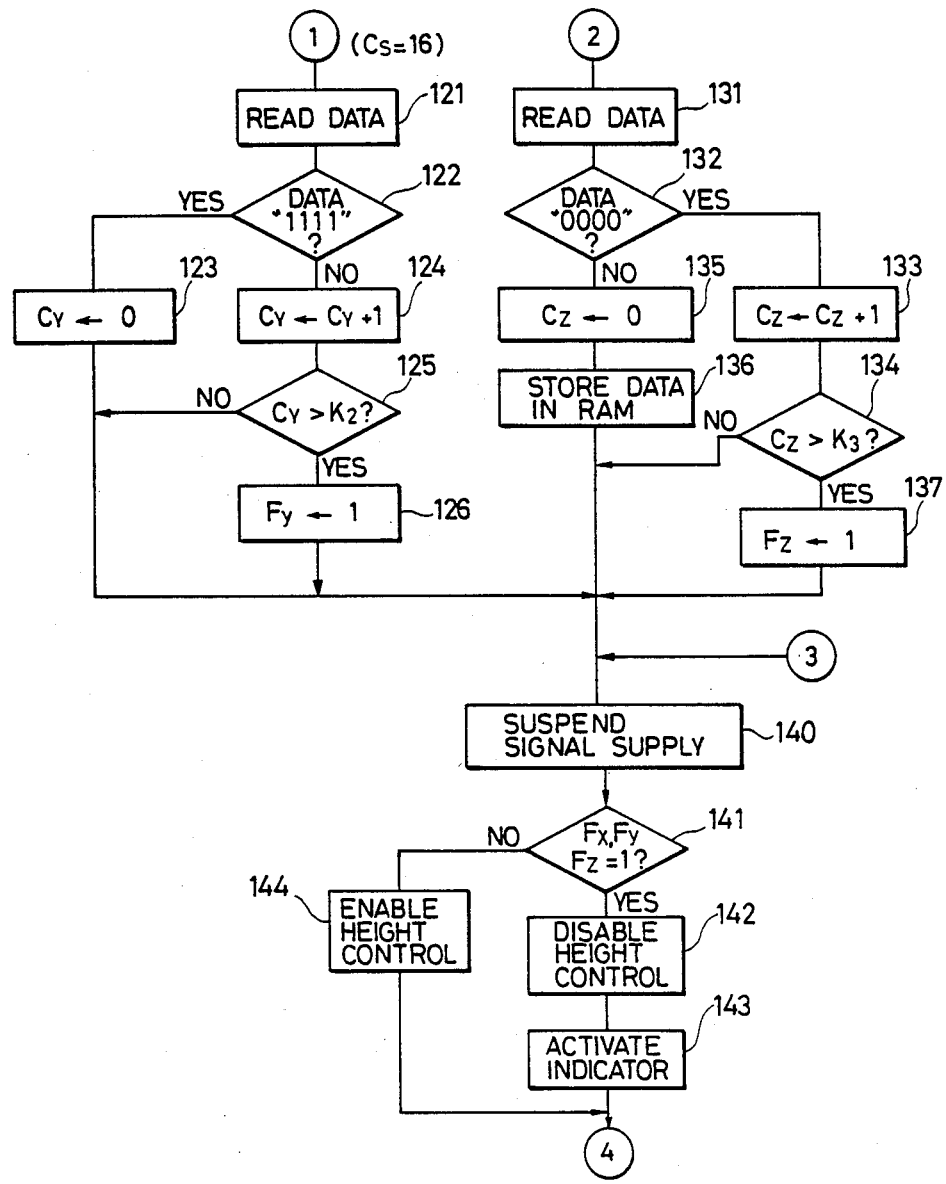

The controller 40 operates in accordance with a program stored in the ROM 71. FIGS. 4 and 5 show a flowchart of the program.

As shown in FIG. 4, a first step 100 of the program initializes or clears the variables Cs, Cx, Cy, and Cz to "0". As will be made clear hereinafter, the variables Cs, Cx, Cy, and Cz correspond to counters. In addition, the step 100 initializes or resets the abnormality detection flags Fx, Fy, and Fz to "0". After the step 100, the program advances to a step 101.

The step 101 increments the value Cs by "1". Specifically, the step 101 executes the statement
"$Cs=Cs+1$".

A step 102 following the step 101 determines whether or not the value Cs equals "17". When the value Cs equals "17", the program advances to a step 104 by way of a step 103 which resets the value Cs to "1". When the value Cs differs from "17", the program directly advances to the step 104. The steps 102 and 103 function to limit the value Cs within a range below "17".

The step 104 determines whether or not the value Cs equals "4", "8", and "12". When the value Cs equals "4", "8", or "12", the program advances to a step 107. When the value Cs equals neither of "4", "8", and "12", the program advances to a step 105.

The step 107 outputs and supplies a common check enabling signal to the vehicle height sensors 20FR, 20FL, and 20R. In addition, the step 107 outputs and supplies a drive signal to one of the vehicle height sensors 20FR, 20FL, and 20R which is selected in accordance with the current value of Cs. Specifically, a drive signal is outputted to the vehicle height sensor 20FR when the value Cs equals "4". A drive signal is outputted to the vehicle height sensor 20FL when the value Cs equals "8". A drive signal is outputted to the vehicle height sensor 20R when the value Cs equals "12". After the step 107, the program advances to a step 109.

The step 105 determines whether or not the value Cs equals "16". When the value Cs equals "16", the program advances to a step 108. When the value Cs differs from "16", the program advances to a step 106.

The step 108 interrupts the supply of the check signal to the vehicle height sensors 20FR, 20FL, and 20R. In addition, the step 108 interrupts the supply of the drive signal to the vehicle height sensors 20FR, 20FL, and 20R. After the step 108, the program advances to the step 109.

The step 106 outputs and supplies a drive signal to one of the vehicle height sensors 20FR, 20FL, and 20R which is selected in accordance with the current value of Cs. Specifically, a drive signal is outputted to the vehicle height sensor 20FR in the case where the remainder equals "1" when the current value Cs is divided by "4". A drive signal is outputted to the vehicle height sensor 20FL in the case where the remainder equals "2" when the current value Cs is divided by "4". A drive signal is outputted to the vehicle height sensor 20R in the case where the remainder equals "3" when the current value Cs is divided by "4". After the step 106, the program advances to the step 109.

The step 109 determines whether or not the time elapsed since the moment of the completion of execution of the preceding step 106, 107, or 108 equals a preset time, for example, 2 msec. When the time elapsed is not equal to the preset time, the step 109 is reiterated. When the time elapsed equals the preset time, the program advances to a step 110. In this way, the step 109 functions to wait the preset time starting from the moment of the completion of execution of the preceding step 106, 107, or 108.

The step 110 determines whether or not the value Cs equals "4", "8", and "12". When the value Cs equals "4", "8", or "12", the program advances to a step 111. When the value Cs equals neither of "4", "8", and "12", the program advances to a step 120.

The step 111 reads the vehicle height data from the four-bit signal outputted by one of the vehicle height sensor 20FR, 20FL, and 20R which is being supplied with the drive signal and the check signal by the execution of the step 107.

A step 112 following the step 111 determines whether or not the read vehicle height data equals "0000". In cases where the connections among the controller 40 and the vehicle height sensors 20FR, 20FL, and 20R are normal, when the drive signal and the check signal are simultaneously supplied to one of the vehicle height sensors, the vehicle height data received by the controller 40 equals "0000". Accordingly, the step 112 checks the connections among the devices 40, 20FR, 20FL, and 20R, for example, the data signal lines and the drive signal line between the devices. In addition, the step 112 can also check the vehicle height sensors 20FR, 20FL, and 20R. When the vehicle height data equals "0000", that is, when the connections are normal, the program advances to a step 113 which sets the value Cx to "0". After the step 113, the program advances to a step 140 of FIG. 5. When the vehicle height data differs from "0000", that is, when the connections are defective or abnormal, the program advances to a step 114 which increments the value Cx by "1".

A step 115 following the step 114 determines whether or not the value Cx is greater than a preset value K1. When the value Cx is greater than the preset value K1, the program advances to a step 116 which sets the abnormality detection flag Fx to "1". After the step 116, the program advances to the step 140 of FIG. 5. When the value Cx is not greater than the preset value K1, the program directly advances to the step 140 of FIG. 5.

Accordingly, in cases where vehicle height data different from "0000" is detected repeatedly during a time interval given by the preset value K1, the abnormality detection flag Fx is set to "1". This process increases the reliability of detection of a malfunction of the connections.

The step 120 determines whether or not the value Cs equals "16". When the value Cs equals "16", the program advances to a step 121 of FIG. 5. When the value Cs differs from "16", the program advances to a step 131 of FIG. 5.

As shown in FIG. 5, the step 121 reads the current vehicle height data from the four-bit signals outputted by the vehicle height sensors 20FR, 20FL, and 20R.

A step 122 following the step 121 determines whether or not all the read vehicle height data are equal to "1111". The steps 105, 108, and 120 suspend the supplies of the drive signals and the check signal to the vehicle height sensors 20FR, 20FL, and 20R when the step 121 is executed. In cases where the connections among the controller 40 and the vehicle height sensors 20FR, 20FL, and 20R are normal, when the vehicle height sensors 20FR, 20FL, and 20R are deactivated and the check signal is not supplied to the vehicle height sensors, the vehicle height data received by the controller 40 are equal to "1111". Accordingly, the step 122 checks the connections among the devices 40, 20FR, 20FL, and 20R, for example, the data signal lines between the devices. Specifically, the step 122 can detect a short circuit of the data signal lines between the devices. In addition, the step 122 can detect a malfunction of the vehicle height sensors 20FR, 20FL, and 20R. When all the vehicle height data are equal to "1111", that is, when the connections are normal, the program advances to a step 123 which sets the value Cy to "0". After the step 123, the program advances to the step 140. When at least one of the vehicle height data differs from "1111", that is, when at least one of the connections is defective or abnormal, the program advances to a step 124 which increments the value Cy by "1".

A step 125 following the step 124 determines whether or not the value Cy is greater than a preset value K2. When the value Cy is greather than the preset value K2, the program advances to a step 126 which sets the abnormality detection flag Fy to "1". After the step 126, the program advances to the step 140. When the value Cy is not greater than the preset value K2, the program directly advances to the step 140.

Accordingly, in cases where the vehicle height data different from "1111" are detected repeatedly during a time interval given by the preset value K2, the abnormality detection flag Fy is set to "1". This process increases the reliability of detection of a malfunction of the connections.

The step 131 reads the current vehicle height data from the four-bit signal outputted by one of the vehicle height sensors 20FR, 20FL, and 20R which is being supplied with the drive signal by the execution of the step 106 but which is not being supplied with the check signal.

A step 132 following the step 131 determines whether or not the read vehicle height data equals "0000". In cases where the connections among the controller 40 and the vehicle height sensors 20FR, 20FL, and 20R are normal, when the drive signal is supplied to the vehicle height sensor but the check signal is not supplied thereto, the vehicle height data received by the controller differs from "0000". Accordingly, the step 132 checks the connections among the devices 40, 20FR, 20FL, and 20R, for example the check signal line between the devices. When the vehicle height data differs from "0000", that is, when the connections are normal, the program advances to a step 135 which sets the value Cz to "0". When the vehicle height data equals "0000", that is, when a malfunction occurs in the connections, the program advances to a step 133 which increments the value Cz by "1".

A step 136 following the step 135 stores the vehicle height data into the RAM 72 for later use in the vehicle height control. After the step 136, the program advances to the step 140.

A step 134 following the step 133 determines whether or not the value Cz is greater than a preset value K3. When the value Cz is greater than the preset value K3, the program advances to a step 137 which sets the abnormality detection flag Fz to "1". After the step 137, the program advances to the step 140. When the value Cz is not greater than the preset value K3, the program directly advances to the step 140.

Accordingly, in cases where the vehicle height data equal to "0000" is detected repeatedly during a time interval given by the preset value K3, the abnormality detection flag Fz is set to "1". This process increases the reliablity of detection of a malfunction of the connections.

The step 140 suspends the supplies of the check signal and the drive signals to the vehicle height sensors 20FR, 20FL, and 20R.

A step 141 following the step 140 determines whether or not at least one of the abnormality detection flags Fx, Fy, and Fz equals "1". When at least one of the abnormality detection flags Fx, Fy, and Fz equals "1", the program advances to a step 142 which disables the vehicle height control. When all the abnormality detection flags Fx, Fy, and Fz differ from "1", the program advances to a step 144 which enables the vehicle height control.

After the step 142, the program advances to a step 143 which activates the indicator 58.

In this way, when a malfunction of the connections among the controller 40 and the vehicle height sensors 20FR, 20FL, and 20R is detected, the vehicle height control via the controller 40 is disabled or interrupted and the indicator 58 is activated to inform of the malfunction.

After the steps 143 and 144, the program returns to the step 101 of FIG. 4. Accordingly, the program is periodically reiterated. The value Cs is incremented by "1" each time the execution cycle of the program changes. The value Cs corresponds to a timing counter. The vehicle height sensors 20FR, 20FL, and 20R are activated sequentially in an order determined by the value Cs. The vehicle height data are sequentially derived from the four-bit output signals of the activated vehicle height sensors. The derived vehicle height data are normally used in the vehicle height control. Also, the derived vehicle height data are used in detecting a malfunction of the check signal line between the controller 40 and the vehicle height sensors. The connections among the controller 40 and the vehicle height sensors 20FR, 20FL, and 20R are repeatedly checked.

Figure 6:
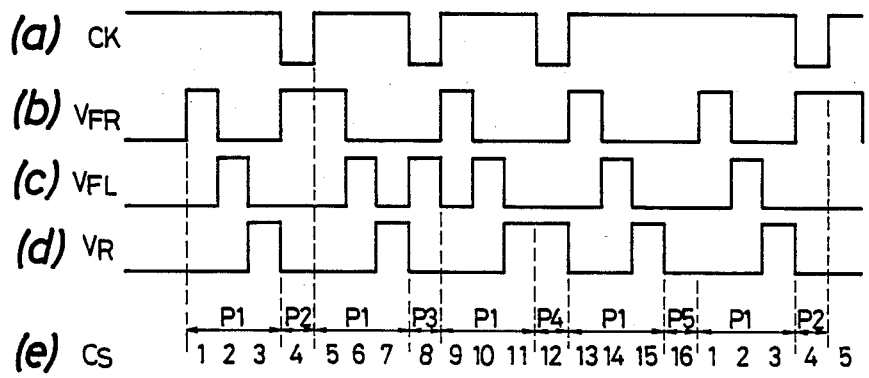
FIG. 6 is a timing diagram of a check signal and drive signals applied to terminals of the vehicle height sensors, and a counter value in the vehicle height detecting system of FIGS. 1 and 3.

As shown by the portion (e) of FIG. 6, the value Cs is periodically incremented by "1". The value Cs is reset to "1" immediately after the value Cs reaches "16". As shown in FIG. 6, during intervals P1 where the value Cs differs from any of "4", "8", "12", and "16", the high-level drive signals (b), (c), and (d) are sequentially outputted to the vehicle height sensors 20FR, 20FL, and 20R in an order determined by the value Cs and the vehicle height data are sequentially derived via the sensors. During intervals P2 where the value Cs equals "4", the high-level drive signal (b) and the low-level check signal (a) are outputted to the vehicle height sensor 20FR so that the connection between the controller 40 and the sensor 20FR is checked. During intervals P3 where the value Cs equals "8", the high-level drive signal (c) and the low-level check signal (a) are outputted to the vehicle height sensor 20FL so that the connection between the controller 40 and the sensor 20FL is checked. During intervals P4 where the value Cs equals "12", the high-level drive signal (d) and the low-level check signal (a) are outputted to the vehicle height sensor 20R so that the connection between the controller 40 and the sensor 20R is checked. The processes during the intervals P2, P3, and P4 correspond to the set of the steps 111–116 of FIG. 4. During intervals P5 where the value Cs equals "16", neither the low-level check signal (a) nor the high-level drive signals (b)–(d) is outputted to the vehicle height sensors 20FR, 20FL, and 20R, the connections among the controller 40 and the sensors are checked in respect of a short circuit. The process during the interval P5 corresponds to the set of the steps 121–126 of FIG. 5.

It should be noted that various design changes may be made in this embodiment. For example, the state "1111" of the vehicle height signal may be allotted for a check on the connections in place of the signal state "0000". The vehicle height sensors may be designed so that, in cases where the connections among the controller and the sensors are normal, the four-bit signals received by the controller will assume the sate "0000" for the state "1111" when the sensors are deactivated. The number of the vehicle height sensors may be different from three. The vehicle height sensors may be designed so that they will output vehicle height signals having a number of bits different from four.

DESCRIPTION OF THE SECOND PREFERRED EMBODIMENT

Figure 7:
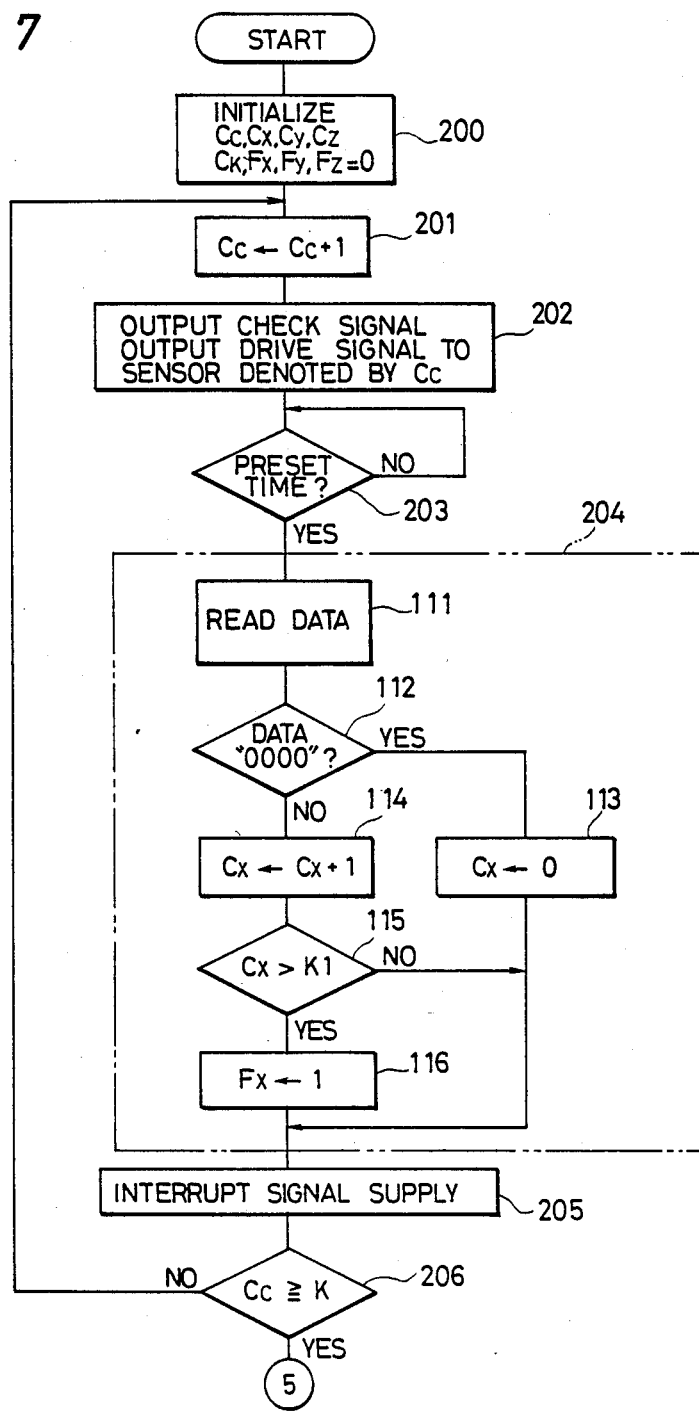
FIGS. 7 and 8 are a flowchart of a program operating an electronic controller in a vehicle height detecting system according to a second embodiment of this invention.
Figure 8:
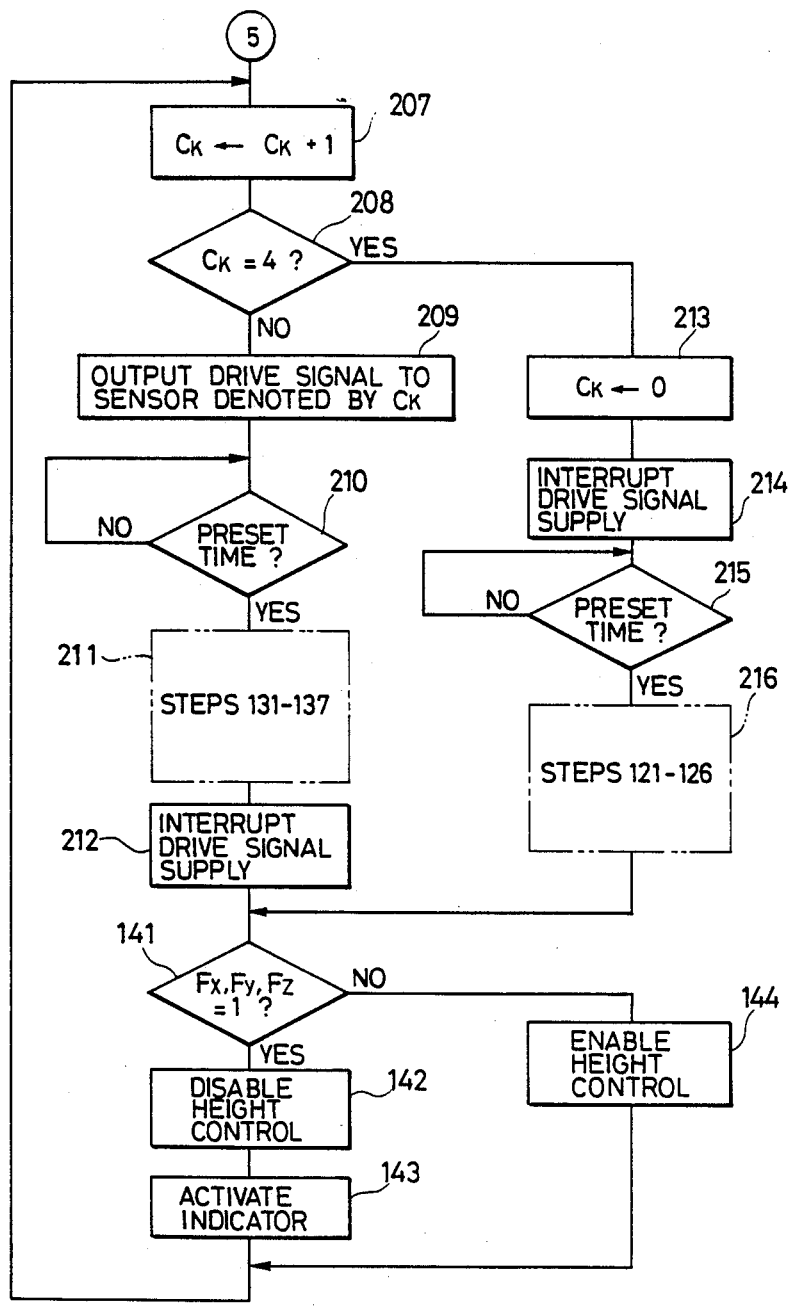

A second embodiment of this invention is similar to the embodiment of FIGS. 1–6 except for design changes indicated hereinafter. FIGS. 7 and 8 show a flowchart of a program operating an electronic controller in the second embodiment. When an ignition key switch is actuated, the program starts.

As shown in FIG. 7, a first step 200 of the program initializes the variables Cc, Cx, Cy, Cz, and Ck to "0" and resets the abnormality detection flags Fx, Fy, and Fz to "0". After the step 200, the program advances to a step 201 which increments the value Cc by "1".

A step 202 following the step 201 outputs a common check enabling signal to all of vehicle height sensors 20FR, 20FL, and 20R (see FIGS. 1 and 3). Also, the step 202 outputs a drive signal to one of the vehicle height sensors which is selected in accordance with the value Cc. Specifically, in the case where the remainder equals "1" when the value Cc is divided by "3", a drive signal is outputted to the vehicle height sensor 20FR. In the case where the remainder equals "2" when the value Cc is divided by "3", a drive signal is outputted to the vehicle height sensor 20FL. In the case where the remainder equals "0" when the value Cc is divided by "3", a drive signal is outputted to the vehicle height sensor 20R.

After the step 202, the program advances to a step 203 which waits a preset time, e.g., 2 msec, as the step 109 of FIG. 4 does.

A block 204 following the step 203 includes steps 111–116 similar to those of FIG. 4. The block 204 checks the connection between the controller and the vehicle height sensor which is being supplied with the drive signal and the check signal. When a malfunction of the connections between the controller and the vehicle height sensors is detected, the abnormality detection flag Fx is set to "1".

A step 205 following the block 204 suspends the supplies of the check signal and the drive signals to the vehicle height sensors 20FR, 20FL, and 20R.

A step 206 following the step 205 compares the value Cc with a preset value K. When the value Cc is smaller than the preset value K, the program returns to the step 201. When the value Cc is equal to or greater than the preset value K, the program advances to a step 207 of FIG. 8.

Accordingly, immediately after the program is started, the connection check by the block 204 is periodically repeated a number of times determined by the preset value K.

As shown in FIG. 8, the step 207 increments the value Ck by "1". After the step 207, the program advances to a step 208.

The step 208 determines whether or not the value Ck equals "4". When the value Ck equals "4", the program advances to a step 213. When the value Ck differs from "4", the program advances to a step 209.

The step 209 outputs a drive signal to one of the vehicle height sensors which is selected in accordance with the value Ck. Specifically, a drive signal is outputted to the vehicle height sensor 20FR when the value Ck equals "1". A drive signal is outputted to the vehicle height sensor 20FL when the value Ck equals "2". A drive signal is outputted to the vehicle height sensor 20R when the value Ck equals "3".

A step 210 following the step 209 waits a preset time as the step 203 of FIG. 7 does.

A block 211 following the step 210 includes steps 131–137 similar to those of FIG. 5. The block 211 reads the current vehicle height data from the four-bit signal outputted by the vehicle height sensor which is being activated by the drive signal. The read vehicle height data is transferred to the RAM 72. In addition, the block 211 checks the connection to the activated vehicle height sensor by referring to the inputted vehicle height data. When a malfunction of the connection is detected, the abnormality detection flag Fz is set to "1".

A step 212 following the block 211 suspends the supply of the drive signal to the selected vehicle height sensor. After the step 212, the program advances to a step 141.

The step 213 resets the value Ck to "0". After the step 213, the program advances to a step 214 which suspends the supply of the drive signals to the vehicle height sensors.

A step 215 following the step 214 waits a preset time as the step 210 does.

A block 216 following the step 215 includes steps 121–126 similar to those of FIG. 5. The block 216 checks the connections between the controller and the vehicle height sensors in respect of a short circuit or the like. When a malfunction of the connections is detected, the abnormality detection flag Fy is set to "1". After the block 216, the program advances to the step 141.

The step 141 determines whether or not at least one of the abnormality detection flags Fx, Fy, and Fz equals "1". When at least one of the abnormality detection flags Fx, Fy, and Fz equals "1", the program advances to a step 142 which disables the vehicle height control. When all the abnormality detection flags Fx, Fy, and Fz differ from "1", the program advances to a step 144 which enables the vehicle height control.

After the step 142, the program advances to a step 143 which activates the indicator 58.

In this way, when a malfunction of the connections among the controller 40 and the vehicle height sensors 20FR, 20FL, and 20R is detected, the vehicle height control via the controller 40 is disabled or interrupted and the indicator 58 is activated to inform the malfunction.

After the steps 143 and 144, the program returns to the step 207. Accordingly, the program of FIG. 8 is periodically reiterated.

Figure 9:
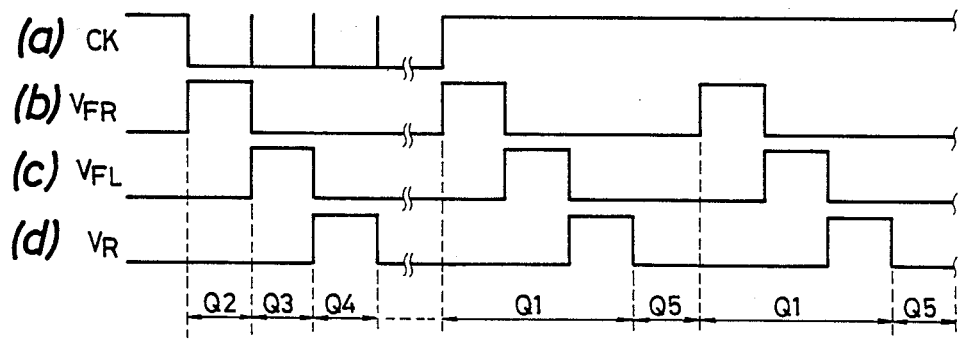
FIG. 9 is a timing diagram of a check signal and drive signals in the vehicle height detecting system of the second embodiment of this invention.

As shown in FIG. 9, recurrent groups of intervals Q2, Q3, and Q4 immediately succeed the moment of a system start or a program start. During the intervals Q2, the high-level drive signal (b) and the low-level check signal (a) are outputted to the vehicle height sensor 20FR so that the connection between the controller 40 and the sensor 20FR is checked. During the intervals Q3, the high-level drive signal (c) and the low-level check signal (a) are outputted to the vehicle height sensor 20FL so that the connection between the controller 40 and the sensor 20FL is checked. During the intervals Q4, the high-level drive signal (d) and the low-level check signal (a) are outputted to the vehicle height sensor 20R so that the connection between the controller 40 and the sensor 20R is checked. The processes during the intervals Q2, Q3, and Q4 correspond to the set of the steps and block 201–206 of FIG. 7. Recurrent groups of intervals Q1 and Q5 follow the groups of the intervals Q2–Q4. During the intervals Q1, the high-level drive signals (b), (c), and (d) are sequentially outputted to the vehicle height sensors 20FR, 20FL, and 20R and the vehicle height data are sequentially derived via the sensors. During the intervals Q5, none of the low-level check signal (a) and the high-level drive signals (b)–(d) is outputted to the vehicle height sensors 20FR, 20FL, and 20R, the connections among the controller 40 and the sensors are checked in respect of a short circuit. The process during the interval Q5 corresponds to the set of the steps and block 213–216 of FIG. 8.

DESCRIPTION OF THE MODIFICATION

Figure 10:
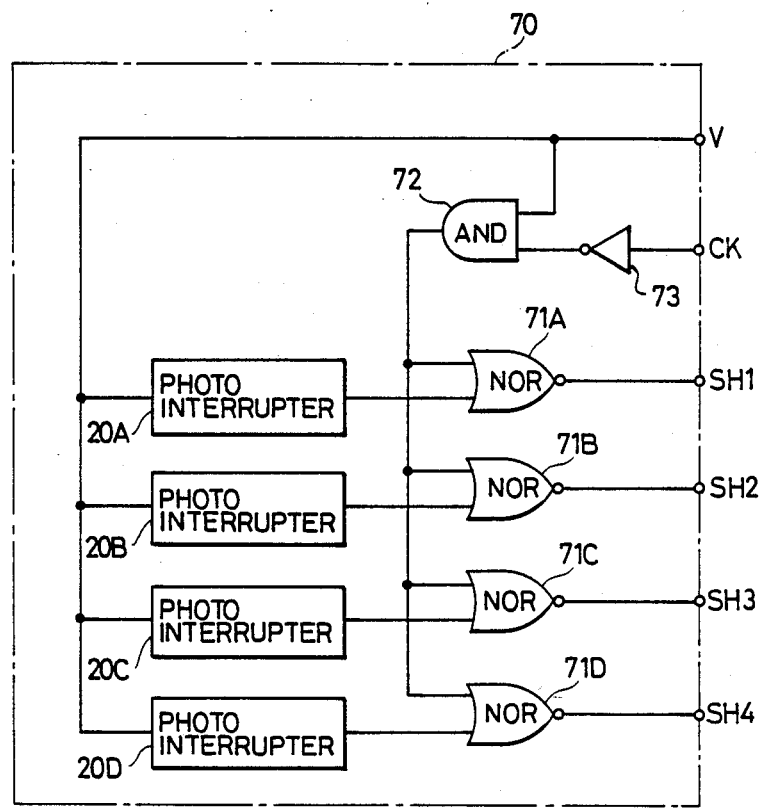
FIG. 10 is a block diagram of a modified vehicle height sensor.

FIG. 10 shows a modified vehicle height sensor used in the previously mentioned embodiments of this invention. The modified vehicle height sensor is similar to the vehicle height sensor of FIG. 2 except for design changes indicated hereinafter.

As shown in FIG. 10, the modified vehicle height sensor 70 includes an AND gate having a first input terminal connected to a drive terminal V and a second input terminal connected to a check terminal CK via an inverter 73. An output terminal of the AND gate 72 is connected to first input terminals of NOR gates 71A, 71B, 71C, and 71D. Second input terminals of the NOR gates 71A, 71B, 71C, and 71D are connected to output terminals of photo-interrupters 20A, 20B, 20C, and 20D respectively. Output terminals of the NOR gates 71A, 71B, 71C, and 71D are connected to sensor output terminals SH1, SH2, SH3, and SH4 respectively. Input terminals of the photo-interrupters 20A–20D are connected to the drive terminal V. The photo-interrupters 20A–20D are similar to those of FIG. 2.

When a high-level drive signal is applied to the drive terminal V, the photo-interrupters 20A–20D are activated so that they generate vehicle height data which are transferred to the output terminals SH1–SH4 via the NOR gates 71A–71D. In cases where a high-level drive signal is applied to the drive terminal V and a low-level check signal is applied to the check terminal CK, the combinations of the AND gate 72, the inverter 73, and the NOR gates 71A–71D generates the "0000" signal at the output terminals SH1–SH4 independent of the vehicle height data from the photo-interrupters 20A–20D.

It should be understood that this invention is not limited to the previously mentioned embodiments and modification. For example, this invention may be applied to a system including a combination of a controller and a sensor detecting a parameter other than a vehicle height.

What is claimed is:

1. A vehicle height detecting system comprising:
    a vehicle height sensor including a switching circuit which is turned on and off in accordance with a vehicle height;
    means for outputting a drive signal to the vehicle height sensor for activating the vehicle height sensor;
    connection means connected to an output side of the switching circuit;
    means for receiving a digital vehicle height data signal from the switching circuit via the connection means;
    means for generating a check signal to detect a break and a short circuit of the connection means;
    means for outputting a preset signal of a first level and a preset signal of a second level to the connection means in response to the check signal and the drive signal, the first-level signal representing first preset check data, the second-level signal representing second preset check data;
    means for receiving the first-level signal and the second-level signal from the connection means and reading the first check data and the second check data from the first-level signal and the second-level signal,
    means for, when the first-level signal is outputted to the connection means, first comparing the read first check data with a first predetermined reference data and judging whether or not a break is present in the connection means as a result of the first comparison; and
    means for, when the second-level signal is outputted to the connection means, second comparing the read second check data with a second predetermined reference data and judging whether or not a short circuit is present in the connection means as a result of the second comparison.

2. The system of claim 1 wherein the vehicle height sensor includes at least first and second sub-sensors located at different positions of a vehicle body.

3. The system of claim 2 wherein the check signal generating means is operative to sequentially output first and second check signals to the first and second sub-sensors.

4. The system of claim 2 wherein the sensor-activating means sequentially outputs first and second drive signals to the first and second sub-sensors, and wherein the check signal generating means outputs a common check signal to the first and second sub-sensors after the first and second drive signals are outputted.

5. The system of claim 2 wherein the sensor-activating means is operative to sequentially output first and second drive signals to the first and second sub-sensors, wherein the check signal generating means is operative to output the check signal after the first and second drive signals are outputted to the first and second sub-sensors, and wherein the first drive signal, the second drive signal, and the check signal are sequentially and periodically outputted.

6. The system of claim 5 wherein the first drive signal, the second drive signal, and the check signal are sequentially and repeatedly outputted at a first period, and wherein the check signal is repeatedly and sequentially outputted to the first and second sub-sensors at a second period.

7. The vehicle height detecting system comprising:
    a vehicle height sensor including a switching circuit which is turned on and off in accordance with a vehicle height;
    means for outputting a drive signal to the vehicle height sensor for activating the vehicle height sensor;
    connection means connected to an output side of the switching circuit;
    means for receiving a digital vehicle height data signal from the switching circuit via the connection means;
    means for generating a check signal to detect a break in the connection means;
    means, included in the vehicle height sensor, for outputting a preset signal to the connection means in response to the check signal, the preset signal representing preset check data;
    means for receiving the preset signal from the connection means and reading the check data from the preset signal; and
    means for, when the preset signal is outputted to the connection means, comparing the read check data with a predetermined reference data and judging whether or not a break is present in the connection means as a result of the comparison.

8. The system of claim 7 wherein the vehicle height sensor includes at least first and second sub-sensors located at different positions of a vehicle body.

9. The system of claim 8 wherein the output sides of the switching circuits of the respective first and second sub-sensors are connected in common to the height data signal receiving means via the connection means.

10. The system of claim 9 wherein the check signal generating means sequentially outputs first and second check signals to the first and second sub-sensors respectfully.

11. The system of claim 9 wherein the sensor-activating means sequentially outputs first and second drive signals to the first and second sub-sensors, and wherein the check signal generating means sequentially outputs a first check signal for detecting an open circuit and a second check signal for detecting a short circuit after the first and second drive signals are outputted.

12. The system of claim 11 wherein the first check signal is sequentially fed to the first and second sub-sensors.

13. The system of claim 7 wherein the reference data represents a value outside a range of values of the vehicle height data.

14. The system of claim 13 wherein the break judging means judges the connection means to be broken when the read check data differs from the reference data.

* * * * *

UNITED STATES PATENT AND TRADEMARK OFFICE
CERTIFICATE OF CORRECTION

PATENT NO. : 4,847,591

DATED : July 11, 1989

INVENTOR(S) : Kazuomi OTA, Hiroaki NISHIMURA, Hirofumi MOKUYA, Kohji KAMIYA, Yoshinori ISHIGURO, Kiyoshi MIYAKE, Hiroshi SAKURAI, Yuuji KUTSUNA, Joji YAMAGUCHI It is certified that error appears in the above-identified patent and that said Letters Patent is hereby corrected as shown below:

Title page:

In area [75] Inventors, please change the name of the eighth inventor from "Yuuji Katsuna" to --Yuuji Kutsuna--.

Signed and Sealed this

Twelfth Day of June, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,847,591

DATED : July 11, 1989

INVENTOR(S) : OTA, et al.

It is certified that error appears in the above-identified patent and that said Letters Patent is hereby corrected as shown below:

TITLE PAGE

[73] Assignees: Nippondenso Co., Ltd., Kariya;
Toyota Jidosha Kabushiki Kaisha,
Toyota, both of Japan Signed and Sealed this Thirty-first Day of July, 1990

Attest:

HARRY F. MANBECK, JR.

Attesting Officer

Commissioner of Patents and Trademarks